US012282712B2

(12) United States Patent
Brown et al.

(10) Patent No.: US 12,282,712 B2
(45) Date of Patent: Apr. 22, 2025

(54) THREE-DIMENSIONAL SYSTEM FOR UUV PERFORMANCE

(71) Applicant: L3Harris Technologies, Inc., Melbourne, FL (US)

(72) Inventors: Hunter C. Brown, Seekonk, MA (US); Cagdas Altin, Warren, RI (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 172 days.

(21) Appl. No.: 16/877,024

(22) Filed: May 18, 2020

(65) Prior Publication Data
US 2021/0019457 A1 Jan. 21, 2021

Related U.S. Application Data

(60) Provisional application No. 62/883,902, filed on Aug. 7, 2019, provisional application No. 62/875,442, filed on Jul. 17, 2019.

(51) Int. Cl.
*G06F 30/20* (2020.01)
*G01S 15/93* (2020.01)
*G01S 19/01* (2010.01)
*G06F 30/15* (2020.01)
*G06F 111/18* (2020.01)
*G09B 9/06* (2006.01)

(52) U.S. Cl.
CPC .............. *G06F 30/20* (2020.01); *G01S 15/93* (2013.01); *G01S 19/01* (2013.01); *G06F 30/15* (2020.01); *G06F 2111/18* (2020.01); *G09B 9/063* (2013.01)

(58) Field of Classification Search
CPC ...... G06F 30/20; G06F 30/15; G06F 2111/18; G06F 30/25; G06F 30/27; G06F 30/28; G06F 2111/00–2119/22; G01S 15/93; G01S 19/01; G09B 9/063
See application file for complete search history.

(56) References Cited

U.S. PATENT DOCUMENTS

| 8,019,447 B2 * | 9/2011 | Hoisington | G09B 9/48 700/31 |
| 9,358,924 B1 * | 6/2016 | Preston | G06F 30/15 |
| 11,022,971 B2 * | 6/2021 | Della Penna | G07C 5/085 |
| 2004/0166478 A1 * | 8/2004 | Scoca | G09B 23/14 434/6 |

(Continued)

OTHER PUBLICATIONS

Christian, Mark Jay, "Post Crash Flight Analysis: Visualizing Flight Recorder Data", Jun. 1989 (Year: 1989).*

(Continued)

*Primary Examiner* — Rehana Perveen
*Assistant Examiner* — Troy A Maust
(74) *Attorney, Agent, or Firm* — Workman Nydegger

(57) ABSTRACT

A vehicle test system is illustrated. The vehicle test system includes a vehicle simulator comprising hardware from a vehicle to be tested. The test system further includes a controller coupled to the vehicle simulator configured to control the vehicle simulator. The test system further includes a 3D environmental simulator coupled to the vehicle simulator, wherein the 3D environmental simulator is configured simulate a 3D environment and movement of a vehicle simulated by the vehicle simulator in the 3D environment based on control inputs to devices for the vehicle simulator.

20 Claims, 11 Drawing Sheets

(56) References Cited

U.S. PATENT DOCUMENTS

| | | | | |
|---|---|---|---|---|
| 2007/0260438 | A1* | 11/2007 | Langer | G01M 17/007 |
| | | | | 703/8 |
| 2012/0316769 | A1* | 12/2012 | Gagliardi | B63B 35/086 |
| | | | | 701/300 |
| 2014/0379171 | A1* | 12/2014 | Kim | B60W 10/06 |
| | | | | 701/2 |
| 2018/0033217 | A1* | 2/2018 | Komada | G07C 5/0841 |
| 2018/0047107 | A1* | 2/2018 | Perl | G06N 5/02 |
| 2019/0043278 | A1* | 2/2019 | Stefan | G06Q 50/10 |
| 2019/0050520 | A1* | 2/2019 | Alvarez | G06F 30/15 |
| 2019/0102840 | A1* | 4/2019 | Perl | G06Q 40/08 |
| 2019/0244444 | A1* | 8/2019 | Mihaltan | G07C 5/0808 |
| 2019/0302761 | A1* | 10/2019 | Huang | G06F 3/00 |
| 2019/0303759 | A1* | 10/2019 | Farabet | G06K 9/4628 |
| 2019/0369626 | A1* | 12/2019 | Lui | G05D 1/0221 |
| 2020/0089247 | A1* | 3/2020 | Shkurti | G05D 1/0257 |
| 2020/0339109 | A1* | 10/2020 | Hong | G01S 13/931 |

OTHER PUBLICATIONS

Diacon, Aaron, et al. "Accuracy and Characteristics of 2012 Honda Event Data Recorders from Real-Time Replay of Controller Area Network (CAN) Traffic." SAE International Journal of Transportation Safety, http://www.jstor.org/stable/26169231 Accessed Jul. 17, 2024 (Year: 2013).*

Song et al. "Modeling and Simulation of Autonomous Underwater Vehicles: Design and Implementation" IEEE Journal of Oceanic Engineering, vol. 28, No. 2, Apr. 2003 (Year: 2003).*

* cited by examiner

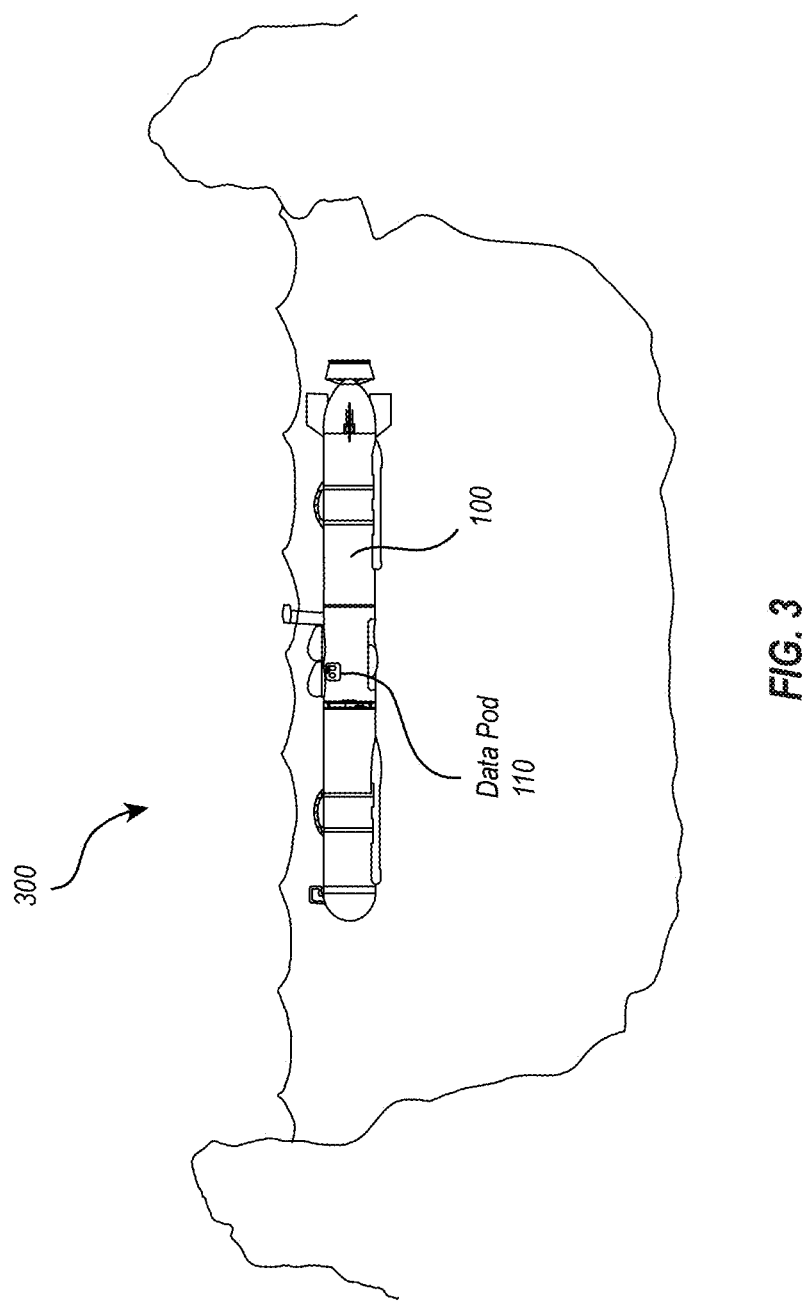

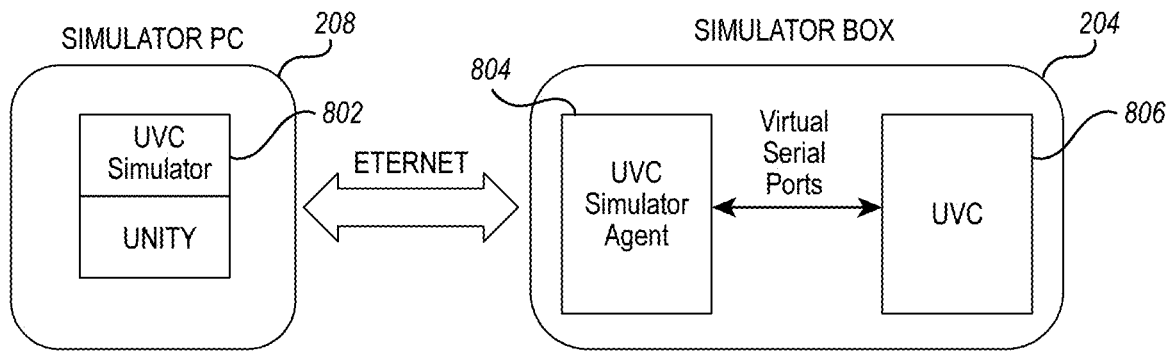
FIG. 8
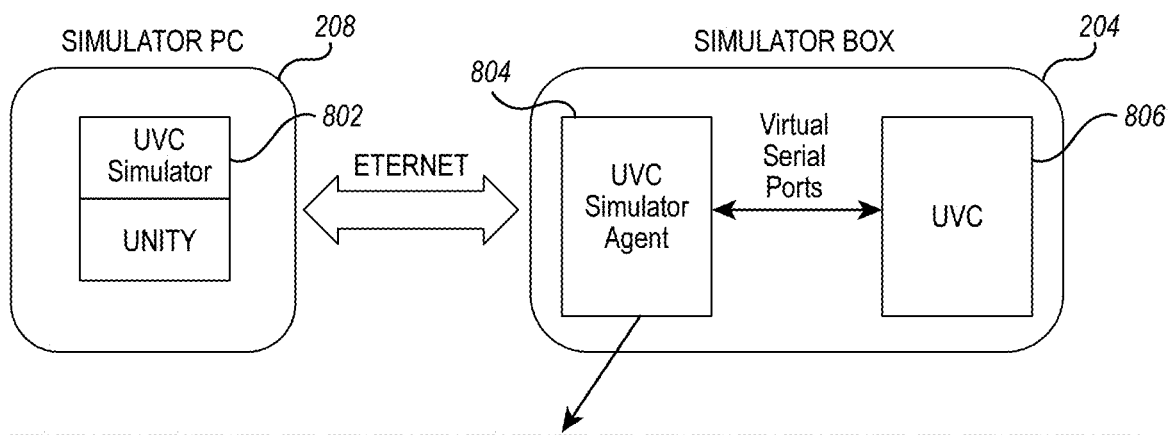
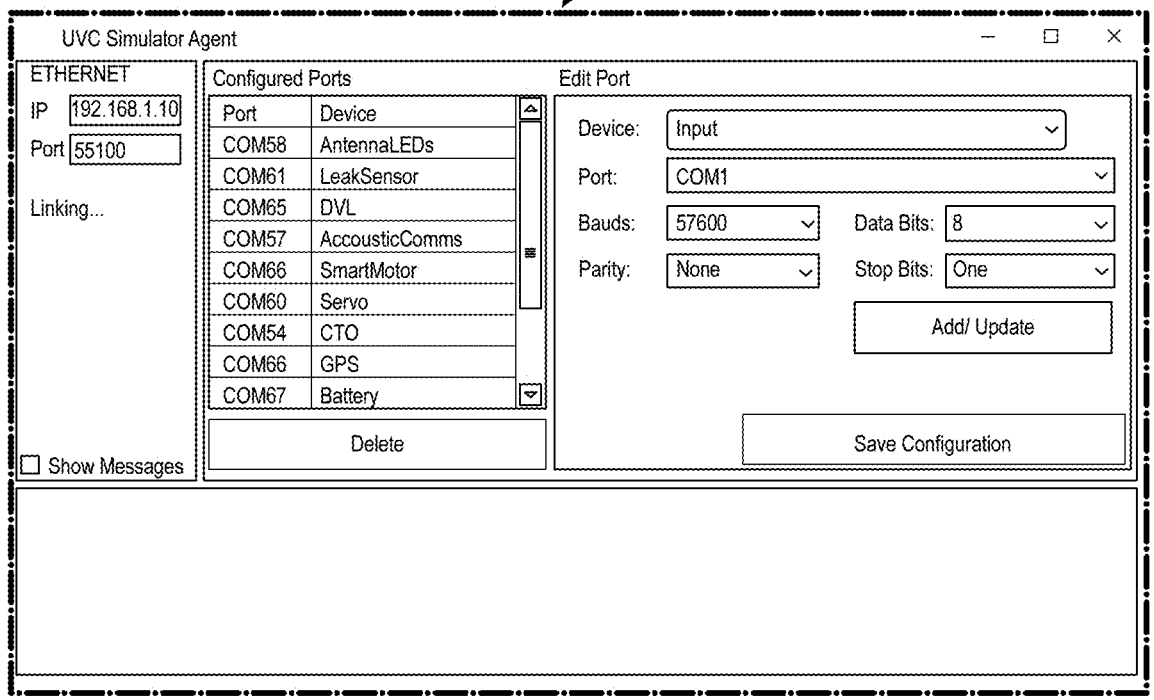
FIG. 9

THREE-DIMENSIONAL SYSTEM FOR UUV PERFORMANCE

CROSS-REFERENCE TO RELATED APPLICATIONS

This application claims priority to U.S. Provisional Application 62/875,442, titled THREE-DIMENSIONAL SYSTEM FOR UUV PERFORMANCE, filed on Jul. 17, 2019, and to U.S. Provisional Application 62/883,902, titled THREE-DIMENSIONAL SYSTEM FOR UUV PERFORMANCE, filed on Aug. 7, 2019 which are both incorporated herein by reference, in their entirety.

BACKGROUND

Unmanned undersea vehicles (UUV) are costly to develop and build. During development of such unmanned vehicles, there is often a need to test various functions of the vehicle including responses to sensor data, responses to input, responses to environmental conditions, and other testing. Such testing can often create perilous situations for such vehicles. For example, input into an unmanned vehicle may cause the unmanned vehicle to become unstable resulting in the unmanned vehicle performing actions that cause the unmanned vehicle to become damaged or lost. Therefore, it may be desirable to implement systems and methods that are able to test unmanned vehicles in ways that reduce or prevent damage and/or loss.

In view of the foregoing, it will be appreciated that there is an ongoing need to test unmanned vehicles without endangering the vessel.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

A vehicle test system is illustrated. The vehicle test system includes a vehicle simulator comprising hardware from a vehicle to be tested. The test system further includes a controller coupled to the vehicle simulator configured to control the vehicle simulator. The test system further includes a 3D environmental simulator coupled to the vehicle simulator, wherein the 3D environmental simulator is configured simulate a 3D environment and movement of a vehicle simulated by the vehicle simulator in the 3D environment based on control inputs to devices for the vehicle simulator.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 3 illustrates a vehicle in an actual environment;

FIG. 8 illustrates additional details regarding the vehicle simulator box and the 3D environmental simulator;

FIG. 9 illustrates additional details regarding the vehicle simulator box and the 3D environmental simulator, including a user interface;

DETAILED DESCRIPTION

Unmanned undersea vehicles (UUV) are useful for gathering important information in underwater locations.

UUVs can provide many unique advantages, such as their precision information retrieval abilities. Because intelligence retrieval missions can require rigorous action, it is often useful that proper testing of the UUVs are performed before the mission is executed. The cost of testing corporeal UUVs is potentially prohibitively expensive because of the high cost of building and developing UUVs and because each additional test of a corporeal UUV increases the risk of damage. As a result, additional tools are needed to test the UUV system prior to use that mitigate or eliminate risk of damage to an expensive device.

The term "unmanned undersea vehicle" is sometimes used interchangeably herein, as a "UUV," "vehicle," and/or "unmanned vehicle."

Figure 1:
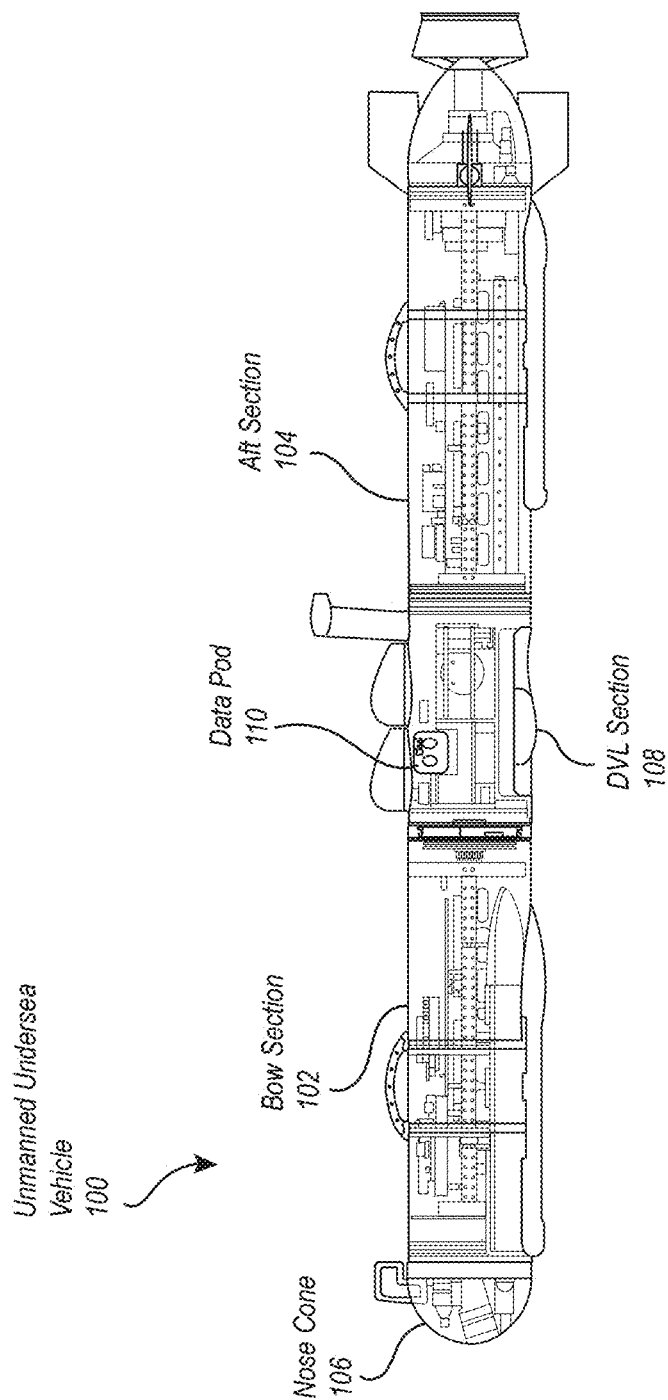
FIG. 1 illustrates an unmanned undersea vehicle.

Referring now to FIG. 1, an example corporeal vehicle 100 (which may be simulated and/or used to collect real world data in various embodiments illustrated herein) is illustrated. The vehicle 100 includes various sections including a bow section 102 and an aft section 104. The bow section 102 is coupled to a nosecone 106. The nosecone is, in some embodiments constructed at least partially having a foam shell which provides weight savings and buoyancy. In particular, the nosecone 106 may be positively buoyant when submerged in water. In some embodiments, the nosecone is constructed from syntactic foam including hollow glass beads and urethane. The nose cone 106 may include open portions and/or portions covered by alternative materials, for use with sensors. For example, in some embodiments, sonar sensors and/or other sensors may be used by the vehicle 100. In some embodiments, the nosecone 106 will include a portion that is penetrable by the sonar signals produced by the sonar sensors.

As depicted in the example illustrated in FIG. 1, the vehicle includes certain sensors, propulsion devices, power sources such as battery packs, control circuitry, storage, etc. For example, attention is directed to a Doppler Velocity Log (DVL) section 108.

The DVL section 108 includes an electronics backplane including a watchdog and battery. The watchdog may be implemented using various processors, memory, computer instructions (which may be stored in volatile memory, stored in firmware, or combinations thereof). Typically, the watchdog will be implemented using at least one processor.

It should be noted that often the vehicle 100 may be used in classified situations which requires that any portion of the vehicle that is able to store data permanently, may need to be treated as a classified device. Therefore, in some embodiments, the watchdog does not include any portion that can store new data persistently. Rather, the watchdog can use permanently encoded firmware data and/or data included in volatile memory. The watchdog may be able to store data permanently in a storage device, such as a removable data pod 110.

Embodiments illustrated herein implement a test system for testing simulated UUVs in a simulated environment.

With reference to FIG. 2, a test system 200 is illustrated. The test system 200 includes a vehicle simulator 202 including a vehicle simulator box 204 and a vehicle simulator screen 206. The vehicle simulator 202 is coupled to a 3D environmental simulator 208. The 3D environmental simulator 208 models and simulates an environment in which a vehicle simulator 202 can interact to simulate interaction of a UUV with an environment. FIG. 2 further illustrates an operator console 210, comprising a general purpose computer system, with appropriate hardware and software to form a special purpose computer system for controlling a vehicle, that can be used to control the vehicle simulator 202 as will be described in more detail below. For example, the console may include applications, data interfaces to interface with the vehicle, etc. Using the test system 200, various simulation scenarios can be implemented virtually with several advantages, including the ability to perform testing without putting an actual vehicle at risk, being able to perform testing without needing to travel to, and accessing a particular environment, the ability to quickly terminate testing, the ability to automatically perform multiple tests, etc.

In particular, testing using the test system 200 allows a system developer to run mission plan trials against a virtual environment. Alternatively or additionally, testing using the test system 200 allows a system developer to verify backseat behavior before implementing features on a real vehicle. Alternatively or additionally, testing using the test system 200 allows a system developer to generate real mission log files for parts manufacturer approval (PMA) process development.

The test system 200 may alternatively or additionally be used to perform system development activities. For example, using the test system 200 a developer may be able to build and/or test software with for a UUV quickly. Alternatively or additionally, the test system 200 may be used to test custom physical payloads with a simulator before implementing the payloads on an actual system. For example, such custom physical payloads may include specialized sensors, specialized power and/or battery arrangements, specialized devices, specialized sample collection devices, etc.

The test system 200 may alternatively or additionally be used to perform post-mission analysis from either a simulated mission and/or an actual mission using data collected from an actual vehicle. For example, in some embodiments the test system 200 may be able to replay missions with visualizations on the 3D environmental simulator 208. Some embodiments may be able to paint environmental data, bathymetry, sidescan, and optical imagery, collected from data collected when an actual vehicle is implemented in an actual environment, directly on a virtual environment during playback. For example, in some embodiments a simulated environment corresponding to an actual environment may be created in the 3D environmental simulator 208. Actual data may be collected from the actual environment when a vehicle is deployed in the actual environment. This collected data may be used to paint the 3D simulation simulated by the 3D environmental simulator 208.

For example, FIG. 3 illustrates the vehicle 100 being used in an actual environment 300. The actual environment 300 includes various terrain characteristics, weather characteristics, obstacles, and other details as discussed previously herein. The vehicle 100 includes sensors that can collect data as the vehicle navigates in the environment 300. Note that in the illustrated example in FIG. 3, the vehicle 100 may be navigated using the operator console 210 illustrated in FIG. 2, the handheld controller 602 (illustrated in FIG. 6, and discussed in more detail below), or other controller as appropriate. Returning once again to FIG. 3, a data pod 110 is illustrated. The data pod 110 may be used to collect data from the sensors on the vehicle 100 as the vehicle 100 navigates through the environment 300.

For example, the data pod 110 may collect sensor data, such as motor speeds, temperature, vehicle speed, sonar data, chemical composition data, etc. This data is stored in the data pod 110. The data pod 110 can then be removed from the vehicle 100 and connected to the vehicle simulator 202 illustrated in FIG. 2A. Alternatively, the data pod 110 and/or the data from the data pod 110 may be provided to the environmental simulator 208 to allow the data to be provided to the simulator box 204 in a simulation environment. In some embodiments, the data may be time stamped to allow sensor data to be provided in an ordered fashion. For example, a simulation can be started at a first time using sensor data having a first time stamp. The simulation can proceed by using sensor data with later occurring time stamps in an ordered fashion to perform a sequential simulation. Note that in some embodiments, a simulation can be played forward or backward using the time stamped data. In some embodiments, the simulation can be jumped to a particular point using the time stamps of the collected data. Thus, embodiments can implement various 'trick modes' when replaying a simulation.

In some embodiments, user input commands can be added to a data time stamped simulation. For example, as a simulation using the time stamped data is in progress illustrating a sequence of events the data pod collected in an actual environment, a user can introduce adjustments to the simulation at a time being simulated. The simulation could then use the time stamped data in combination with the adjustment to create a simulation that adjusts the time stamped data as the simulation progresses.

In this way, the data from the data pod 110 can be played back to the simulator box 204 to simulate previous interactions with the vehicle 100 in an actual environment 300. In this example, actual data from an actual environment 300 is used to simulate the vehicle 100 in a simulated environment simulated by the simulator 208. In particular, in some embodiments, the simulated environment can be constructed from the data collected by the vehicle 100 in the actual environment 300.

Various embodiments and scenarios implementing the test system 200 can eliminate a number of potential drawbacks that would otherwise exist without the test system 200. In particular, using the test system 200 may allow for the elimination or simplification of logistics of transport and deployment of vehicles. Alternatively or additionally, using the test system 200 may allow for the elimination or reduction of risks of operating in unknown environment. Alternatively or additionally, using the test system 200 may allow for the elimination or reduction of risks inherent in new behavior being implemented on a vehicle and/or new software being implemented on a vehicle. Alternatively or additionally, using the test system 200 may allow for the elimination or reduction of financial costs of field work. Alternatively or additionally, using the test system 200 may allow for the elimination or reduction of schedule risk of field work due to weather delays, unavailability of certain equipment, or other delay causing events. Alternatively or additionally, using the test system 200 may allow for the elimination or reduction of the need to access a physical vehicle for development and testing.

Figure 2A:
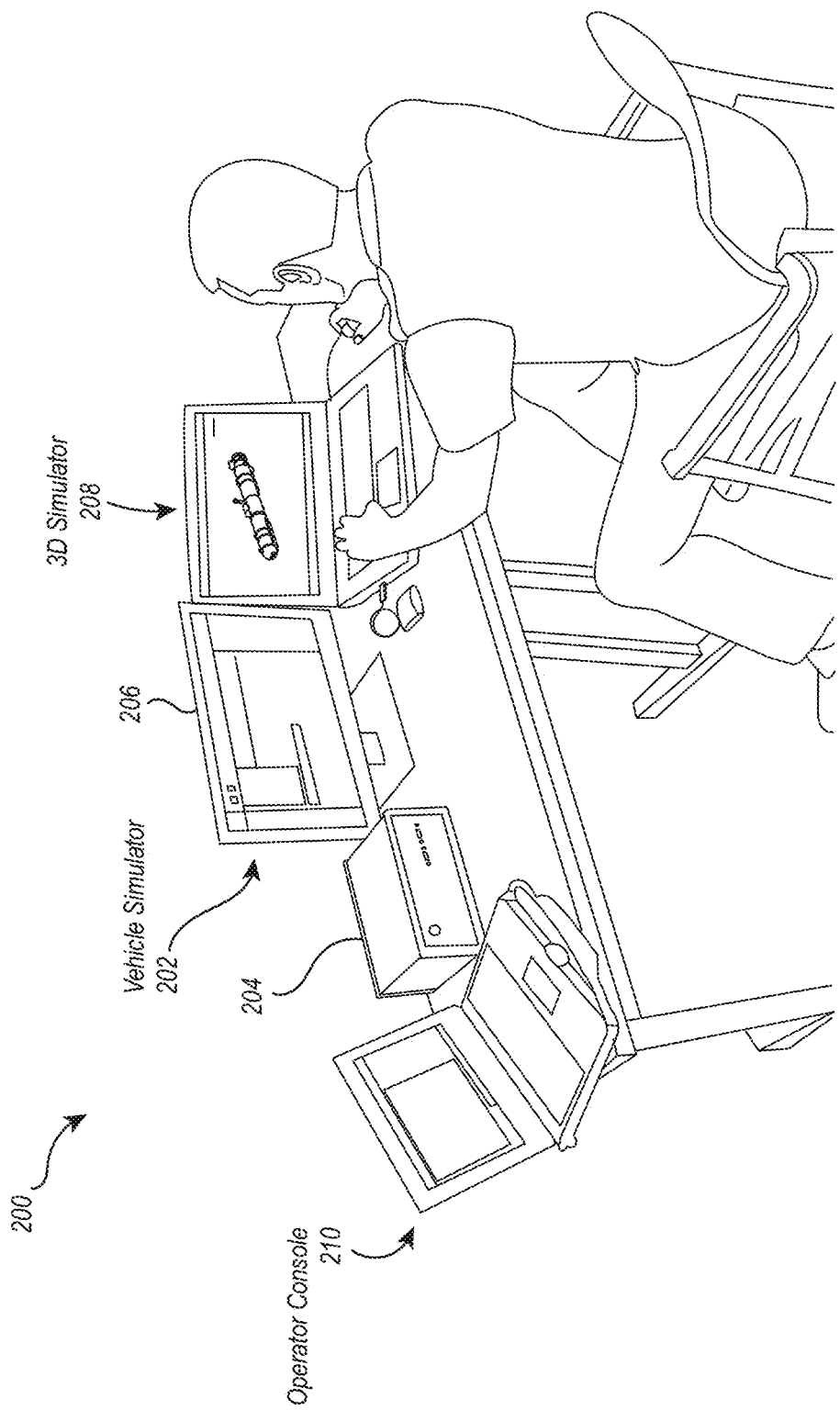
FIG. 2A illustrates a vehicle simulation system.
Figure 2B:
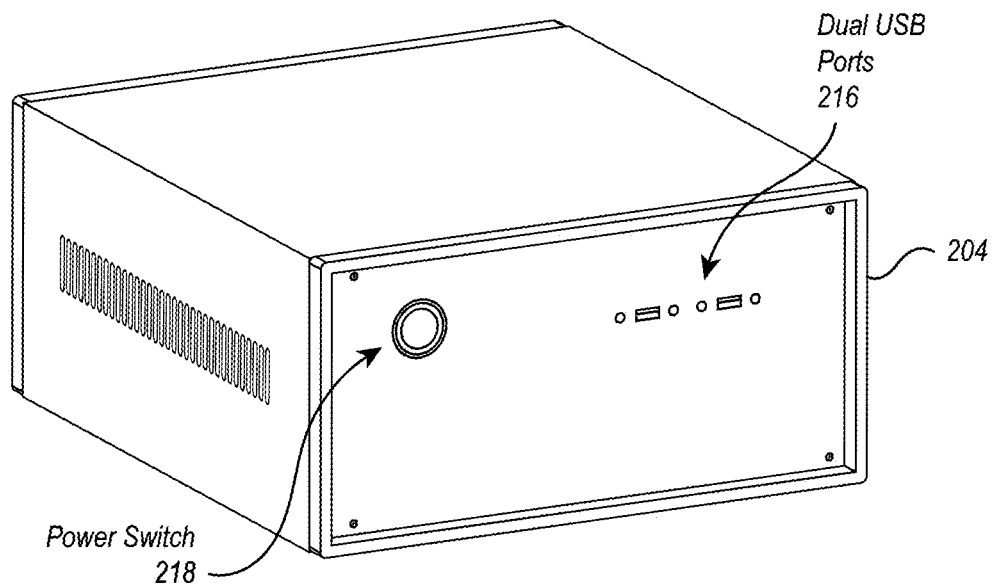
FIG. 2B illustrates another view of the vehicle simulator box.
Figure 2C:
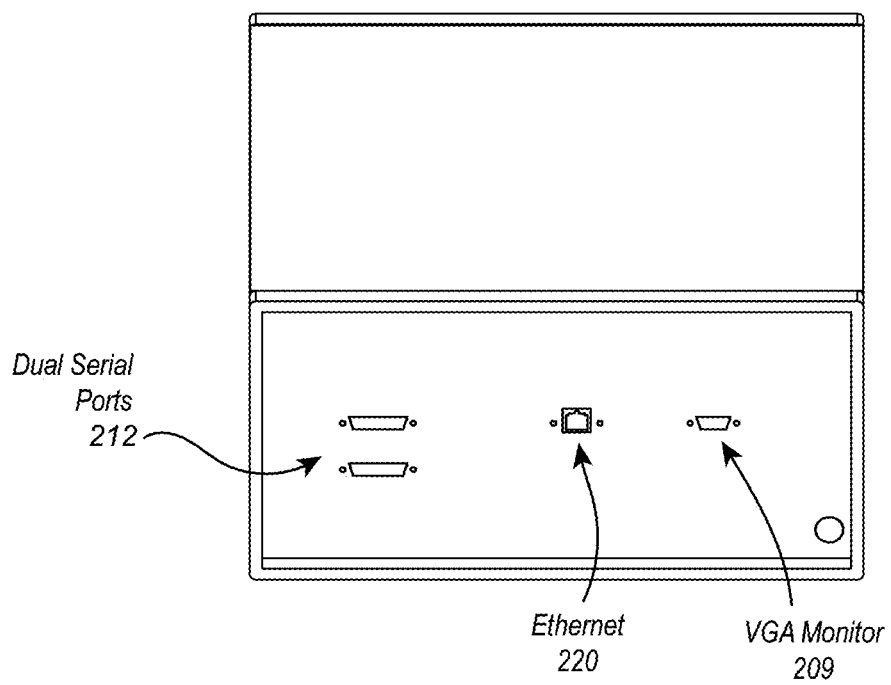
FIG. 2C illustrates another view of the vehicle simulator box.

Referring now to FIG. 2B and FIG. 2C, additional details of the vehicle simulator box 204 are illustrated. In some embodiments, the vehicle simulator box 204 includes actual hardware implemented in vehicles being simulated. For example, the vehicle simulator box 204 may include hardware such as various processors, volatile storage such as memory, nonvolatile storage, sensor inputs, device control outputs, communication interfaces, etc. and software that are identical to those implemented, or to be implemented, in actual vehicles. Using the actual hardware implemented on actual vehicles can help to assure that software performance of the vehicle simulator 202 is identical (or nearly identical) to what would be observed when testing actual vehicles.

FIGS. 2B and 2C illustrate that the vehicle simulator box 204 includes a power switch 218 that can be used to couple electrical power to the hardware components in the vehicle simulator box 204. FIG. 2A further illustrates that the vehicle simulator box 204 includes dual USB ports 216. The USB ports 216 can be used to connect various interface components to the vehicle simulator box 204 such as keyboards, mice, sensors, or other appropriate devices. While two USB ports are shown, it should be appreciated that any practical number of USB ports can be implemented. Alternatively or additionally, other interface connections such as Bluetooth or other interfaces may be implemented. FIG. 2B illustrates that the vehicle simulator box 204 includes dual serial ports 212. The dual serial ports 212 allow for the connection of the various serial based communication devices such as is common in many sensors, output devices, etc. Note that while two serial ports are illustrated, it should be appreciated that other numbers of ports may be implemented. Additionally or alternatively other types of connectors and interfaces may be implemented. For example, interfaces that operate using appropriate protocols and hardware configurations may be implemented depending on the types of sensors and/or controlled devices that may be coupled to the vehicle simulator box 204. FIG. 2B further illustrates that the vehicle simulator box 204 includes an ethernet connector 220. The ethernet connector 220 connects to networking hardware that allows the vehicle simulator box 204 to be connected to a network for sending data to the vehicle simulator box 204 and/or receiving data from the vehicle simulator box 204. In some embodiments, networking hardware is Gigabit Ethernet hardware. Note that while an ethernet connector 220 is shown, the simulator box 204 may alternatively or additionally include other networking hardware such as wireless networking hardware, or other networking hardware. Note that simulated sensor data can be provided to the vehicle simulator box 204 in any appropriate fashion using any appropriate interfaces.

FIG. 2B further illustrates a VGA monitor port 209. This can be used to connect to the vehicle simulator screen 206 to monitor the state of the vehicle simulator box 204. Note that while VGA ports are shown, other appropriate interfaces may be used, alternatively or additionally. For example, HDMI, RCA, or other video outputs may be used.

Some embodiments of the vehicle simulator box 204 include connections via Wi-Fi, handheld controllers, and vector map radio interaction (just like on actual vehicles).

Referring again to FIG. 2A, details regarding the 3D environmental simulator 208 are illustrated. As illustrated in FIG. 2A, the 3D environmental simulator 208 may be implemented using a computer and appropriate hardware and software. For example, in some embodiments, the 3D environmental simulator 208 may be implemented using a computer along with the Unity Real-Time Development Platform available from Unity Technologies. The 3D environmental simulator generates synthetic sensor data based on virtual real-time environment. Some embodiments may include a user-scripted ability to degrade sensors (noise profiles, malfunction, etc.). Alternatively or additionally, some embodiments of the 3D environmental simulator 208 include pre-generated or user-defined bathymetric maps. Alternatively or additionally, some embodiments of the 3D environmental simulator 208 include user-defined initial position (which could be any worldwide location). Alternatively or additionally, some embodiments of the 3D environmental simulator 208 provide real-time 3D visualizations.

Alternatively or additionally, some embodiments of the 3D environmental simulator 208 include support for integration of Virtual Reality (VR) equipment (such as HTC Vive, Oculus equipment, etc.). Thus, for example, user may use a headset to view a simulation. In particular, the 3D environmental simulator 208 may be coupled to the headset to provide various views to the user. In this way the user can interact with a simulated vehicle in a simulated environment simulated by the 3D environmental simulator 208 to perform actual control of the simulated vehicle. Alternatively, the user can watch a replayed navigation of the actual vehicle 100 in the actual environment 300, except that the replay is replayed in a virtual version of the actual environment 300 simulated by the simulation computer 206. Indeed, in some embodiments, the replay may be from the perspective of the vehicle 100.

The following illustrates a particular workflow that may be implemented using the test system 200. A developer could plan and upload a mission to the vehicle simulator 202 via Vector Map and/or Wi-Fi. The vehicle simulator 202 is initialized including initialization of bathymetric environment, starting position, sensor configurations, etc. An operator will start the mission via a handheld controller (see FIGS. 6 and 7) or operator console 210. The operator can monitor a visualization (real-time) on the 3D environmental simulator 208. Alternatively or additionally, an operator can monitor the simulated UUV (real-time) using the vehicle simulator screen 206. The operator can end the mission. PMA of log files are generated aboard the vehicle simulator 202.

Figure 4:
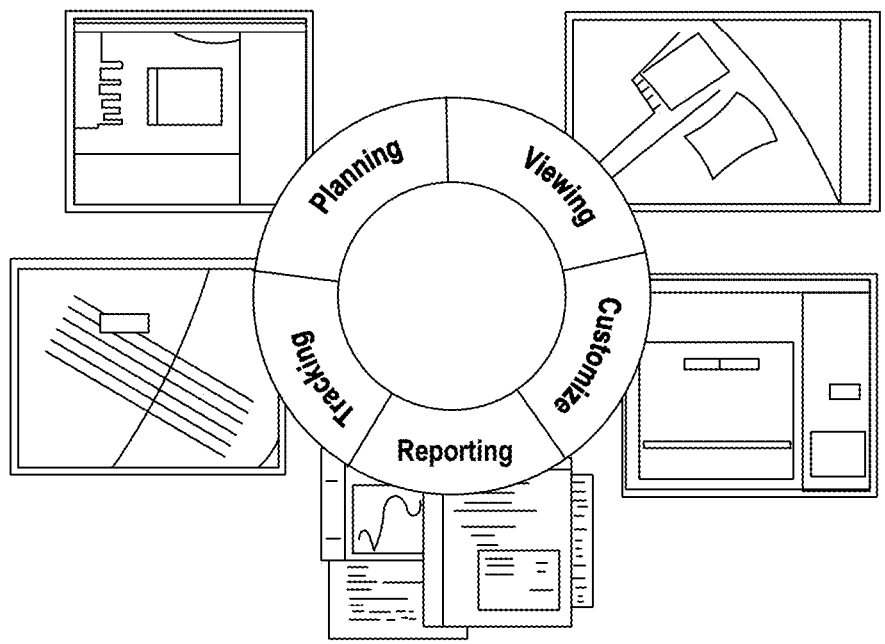
FIG. 4 illustrates a mission cycle.
Figure 5:
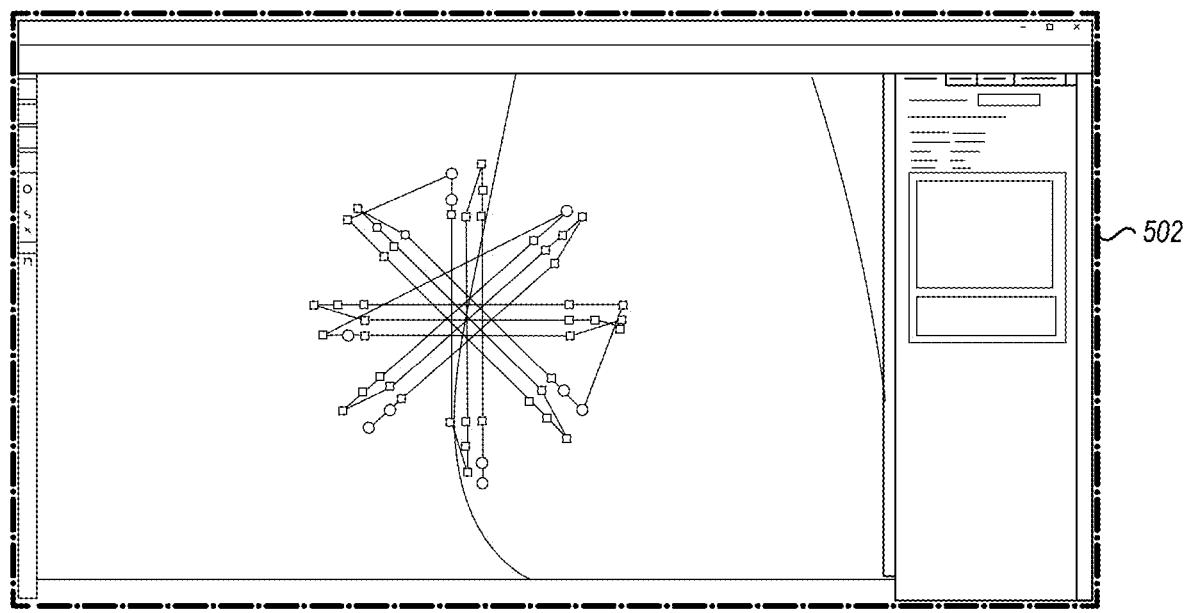
FIG. 5 illustrates a user interface for a mission planning tool.

Referring now to FIGS. 4 and 5, additional details regarding mission planning are illustrated. In particular, FIG. 5 illustrates a geographic-based mission planning tool 502 that may be implemented on the operator console 210.

In practice, there is no limit on the complexity of missions or number of waypoints that may be implemented in a particular mission. Embodiments may implement user modifiable safety settings so that an operator can plan a mission within a particular risk tolerance using the planning tool 502. Embodiments may implement flexible sensor configurations using the planning tool 502.

Figure 6:
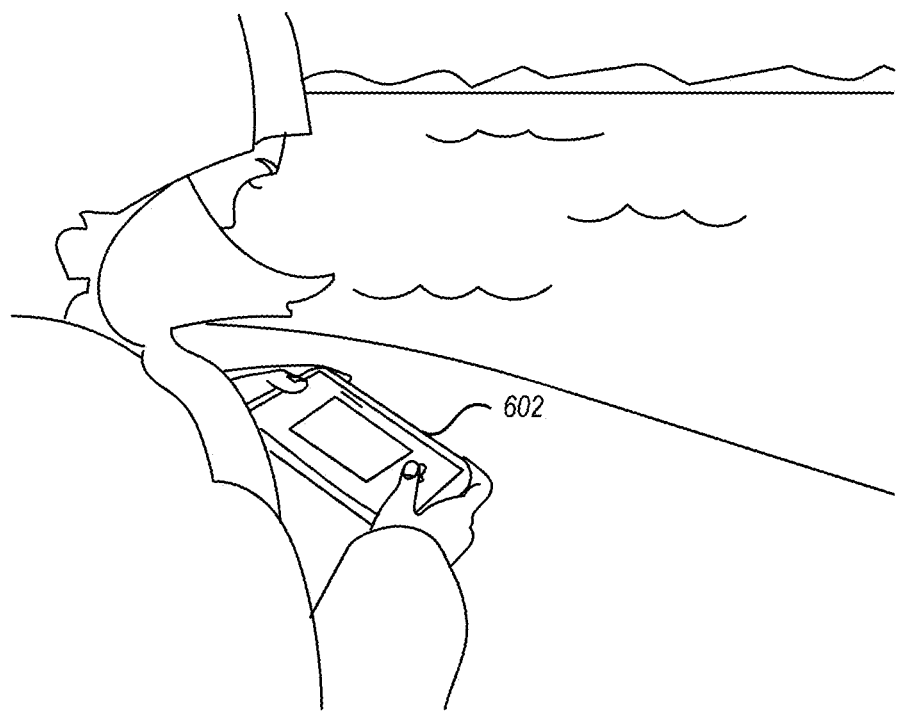
FIG. 6 illustrates a handheld controller.
Figure 7:
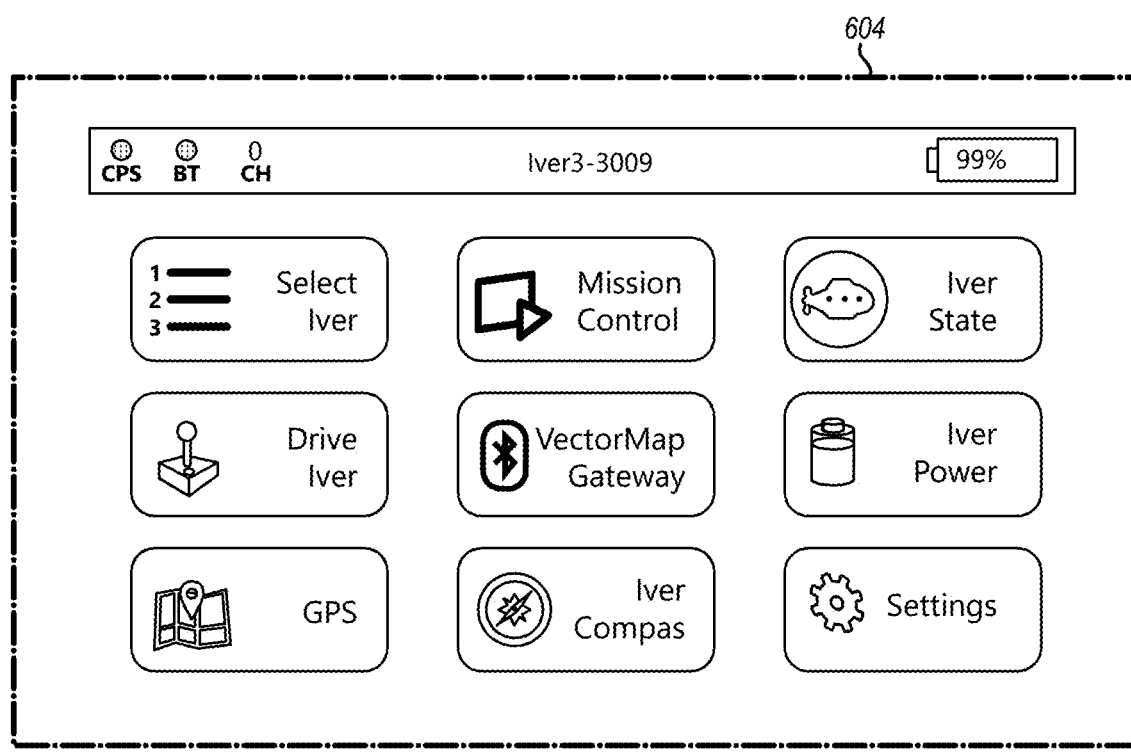
FIG. 7 illustrates the handheld controller display.

Referring now to FIGS. 6 and 7, a handheld controller 602 is illustrated. FIG. 7 illustrates the handheld controller display 604. The handheld controller 602 is coupled to the vehicle simulator 202, although the controller 602 could be used to control an actual vehicle 100 having radio receiver hardware as well. In the illustrated example, the handheld controller 602 works over radio which is also installed in the simulator box 204. The handheld controller allows for remote monitoring, mission control and manual driving. The test system 200 allows an operator using the handheld controller 602 to experience a real training environment.

The 3D environmental simulator 208 is a 3D simulator which includes, for example, a Unity application that benefits from the 3D visualization capabilities and physics engine of the framework. The 3D environmental simulator 208 defines a virtual world with water and terrain data that enables providing geo coordinates and underwater depth data.

In some embodiments, the vehicle simulator 202 communicates with all of its sensors through physical or virtual serial ports. This single way of communication makes it easy to integrate with an environmental simulator.

The Gigabit ethernet hardware in the vehicle simulator box 204 provides the necessary bandwidth to various sensor data.

FIGS. 8 and 9 illustrate simulator architecture. The UVC Simulator 802, which typically comprises computer hardware and software implemented on the simulator 208, generates the sensor data using the terrain info in the model at the 3D environmental simulator 208 and sends it to simulator box 204 over ethernet. This sensor data is received by the UVC simulator agent 804, a component typically implemented using hardware and software at the simulator box 204, which converts the ethernet message to a serial message and forwards it to UVC 806. When running a mission, the UVC 806 drives the motor drivers to move the vehicle (in this case a virtual vehicle). These messages are captured by the agent and passed to the environmental simulator. 208. The environmental simulator 208 in turn moves the vehicle in the virtual world based on the motor commands.

Figure 10:
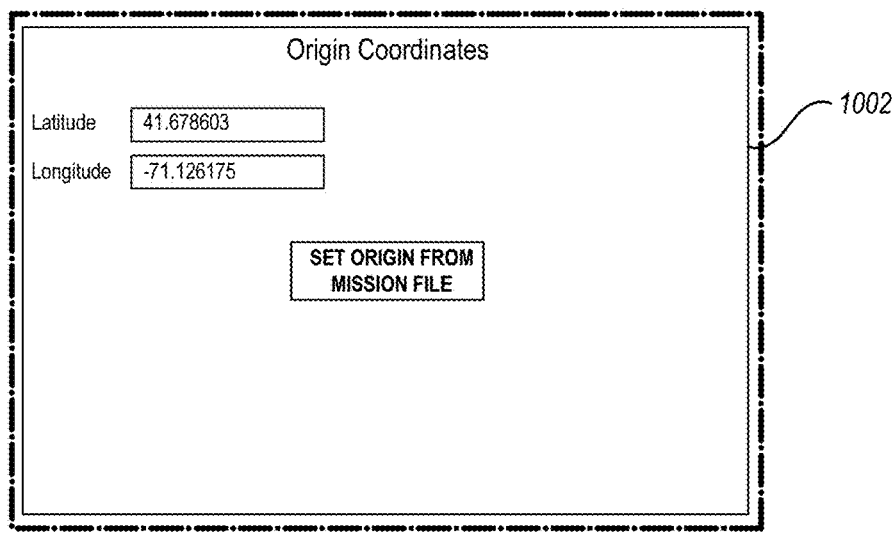
FIG. 10 illustrates a user interface for inputting a starting coordinate for a mission.
Figure 11:
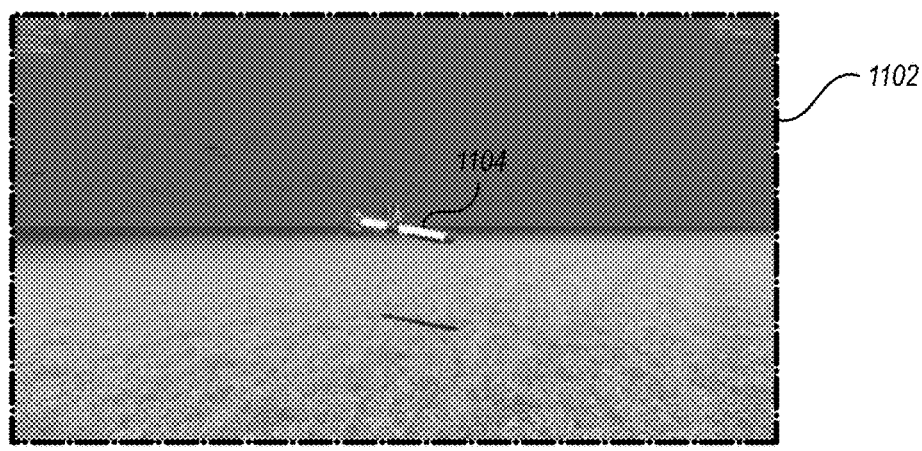
FIG. 11 illustrates a user interface showing a 3D virtual word and virtual vehicle.

Referring now to FIGS. 10 and 11, the environmental simulator 208 defines and displays in a user interface a 3D virtual world 1102 where the virtual vehicle 1104 can move in any direction. The user defines the latitude, longitude of the origin (0,0,0) in a user interface 1002 presented at the 3D environmental simulator 208 (see FIG. 10). The GPS coordinates of the vehicle is calculated using its position (x,y,z) in the virtual world 1102 and the origin GPS coordinates. The environmental simulator 208 can determine the vehicle's Height From Bottom (HFB) and Depth From Surface (DFS) at any point using the terrain data and water surface position(0).

The following now illustrates various details with respect to sensor and device simulation. As used herein, sensors are items that gather data, whereas devices are items that receive commands.

With respect to GPS sensor simulation, in some embodiments, GPS sensor data is produced by calculating the GPS coordinates of the vehicle 1104 in the virtual world 1102 and sent to the simulator box 204 when the vehicle 1104 is on the surface and not sent when the vehicle 1104 is underwater.

With respect to compass sensor simulation, in some embodiments, the Heading-Roll-Pitch of the data is calculated using the orientation of the vehicle 1104 in the virtual world 1102. In some embodiments, the calculated heading is True North, but is converted to magnetic north by using the GPS coordinates of the vehicle. In some embodiments, Gaussian noise is added to all fields in the data to simulate real-world data.

With respect to propeller device simulation, in some embodiments, motor commands sent by the UVC to the motor driver is converted to speed and sets the speed of the vehicle 1104 in the virtual world 1102.

With respect to DVL sensor simulation, in some embodiments, the DVL provides the speed of the vehicle reference to sea bottom and also height from bottom. The speed data comes from propeller simulation and HFB comes from terrain data. Gaussian noise is added to both data to simulate real-world data.

With respect to battery sensor/device simulation, in some embodiments, the power consumption of all sensors in the system is integrated over time.

Various sensors and/or devices can be simulated. For example, embodiments may simulate any combination of the following sensors: compass, CTD (Conductivity, Temperature, Depth), GPS, DVL, INS, Battery, Propeller, Fins, LEDs, or other sensors.

Figure 12:
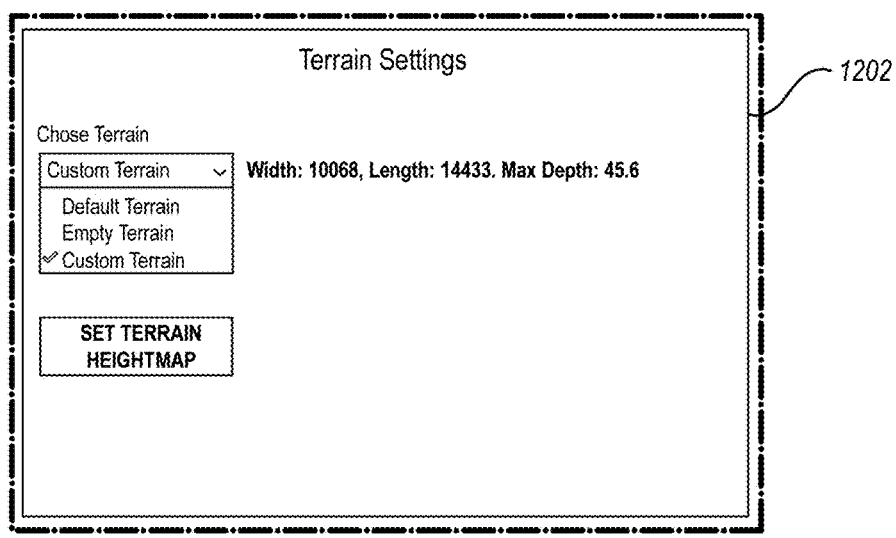
FIG. 12 illustrates a user interface allowing for selection of terrain settings.
Figure 13:
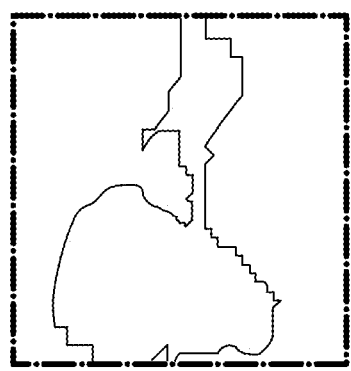
FIG. 13 illustrates a user interface showing a terrain selection.
Figure 14:
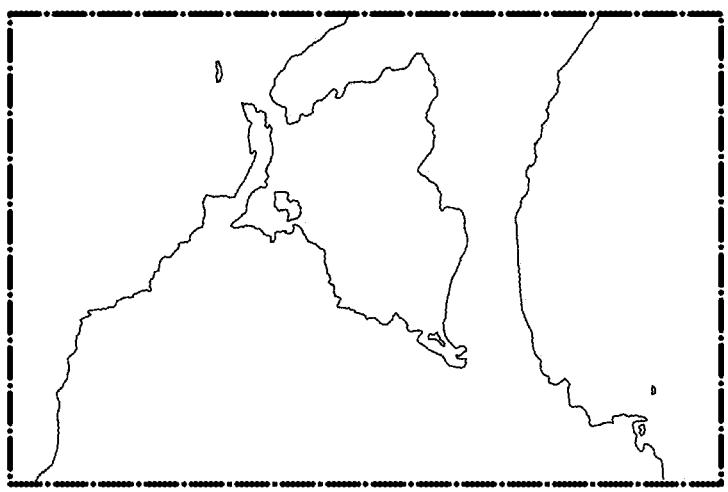
FIG. 14 illustrates another user interface showing another terrain selection.

With reference now to FIGS. 12, 13, and 14, in some embodiments there are three types of terrain offered by the environmental simulator 208, namely: default terrain, empty terrain, or custom terrain. Note that various combinations of these may be implemented in a given environmental model. Terrain may be selected using the user interface element 1200 and to illustrated in FIG. 12 of the environmental simulator 208.

Default terrain provides a terrain with land and with varying underwater depths to run simple missions. Empty terrain provides a vast terrain with no land or other obstacles. Additionally or alternatively, in some embodiments the terrain is flat. This allows for simulating an underwater surface to run long missions. Custom terrain allows users to define their own terrain by providing xyz data. The xyz data can be generated from ENC charts using 3rd party tools.

Using the test system 200 can provide a number of benefits. For example, in some embodiments, the test system 200 can be implemented for operator training. In particular, the test system 200 can provide a real-world usage experience at a very low cost and risk-free environment. Alternatively or additionally, the test system 200 allows verification of the correctness of missions planned by running it through the simulator and checking the post-mission data.

Embodiments of the test system 200 can be used for product testing. For example, some embodiments of the test system allow for testing of various algorithms that are hard to create or inject at in-water tests such as:

How does the vehicle behave if one of the sensors break at runtime?

How does the vehicle behave if the sensor data is noisy?

How does the vehicle behave at harsh water conditions like high currents?

Some embodiments of the test system 200 can be used as a platform for initial testing of new features.

Some embodiments of the test system 200 can be used for internal development. In particular, software developers or testers typically need a vehicle for development efforts which is costly. The test system 200 provides a cost-effective development environment.

Figure 15:
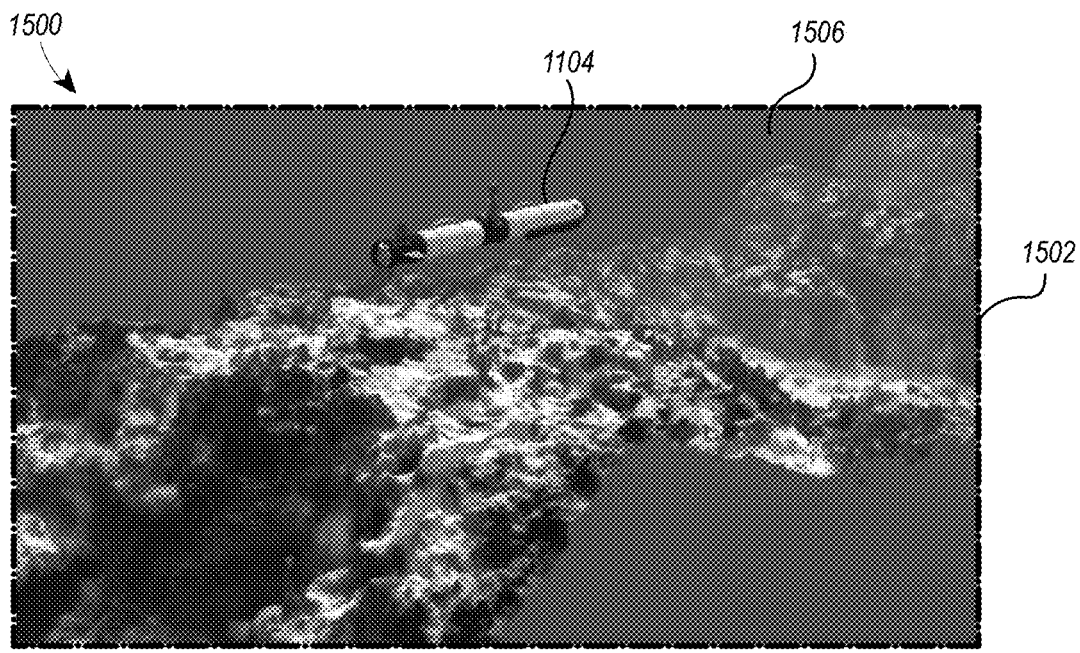
FIG. 15 illustrates a rendering of a mixed world showing a virtual world painted with real world data.

Referring now to FIG. 15, some embodiments may be able to implement post-mission visualization as discussed above. In particular, FIG. 15 shows a user interface 1500 and to that displays the vehicle 1104 in a mixed environment 1506. In this example, the mixed environment 1506 includes elements of a virtual world combined with real world sensor data. In particular, the elements of the virtual world can be painted with data collected by an actual vehicle mission such as photographs, sensor data sensing terrain, or other sensor data. In some embodiments, collected data may be used to playback a mission showing movement of the vehicle 1104 in the mixed environment 1506 to show a video representation of a mission that occurred in an actual environment. In some embodiments, a user may be able to change perspectives, including in some examples a first-person perspective, to allow the user to replay an actual mission in a virtual environment in a realistic fashion. Note that as discussed previously, in some embodiments, the user may be able to replay the visualization using virtual reality hardware so as to provide an even more immersive experience for the user.

Thus, with the simulation illustrated in FIG. 15, various simulations may be performed where control data and sensor data are provided to a physical vehicle simulator 202, where the vehicle simulator 202 has hardware and software intended to be used on an actual vehicle. For example, in a first example, a simulated environment may be created, entirely artificially created in the 3D environmental simulator 208. A user can input real-time control commands to device controls at the vehicle simulator 202 from the operator console 210 or handheld controller 602. Sensor inputs can be provided from the 3D environmental simulator 208 based on navigation simulated as a result of the real-time user input. This allows a user to simulate an interactive vehicle simulation using actual vehicle hardware, without needing to launch an actual vehicle.

In an alternative example, a pre-programmed simulation may be implemented. In this example, device control inputs are pre-programmed rather than a user needing to enter them in real time. In some embodiments, the pre-programming is performed based on known characteristics of the 3D environment simulated by the 3D environmental simulator 208. Thus, in this example, a simulation can be "played" according to a pre-determined program. In one example, the programming may be based on a previous simulation where manual inputs to devices from the operator console 210 or handheld controller 602, and sensor input from the 3d environmental simulator 208 can be replayed from a previous simulation. The control input and sensor input previously collected can be stored by the operator console 210 and 3D environmental simulator 208 respectively, or by other systems able to be coupled to the inputs of the vehicle simulator 202 to replay the inputs to the vehicle simulator 202 to perform an automated simulation.

In yet another example, real word control inputs and sensor inputs can be saved from an actual deployed vehicle in an actual environment (see e.g., FIG. 3 above and the related description). These actual control inputs and sensor inputs can be saved and replayed to the vehicle simulator 208 to replay an actual vehicle mission in the simulated 3D environment simulated by the 3D simulator 208. Note that in some embodiments, the simulated 3D environment can be simulated using actual data collected during an actual mission performed by a vehicle in a real environment.

Thus, simulations can be performed using real-time control inputs from a user, real-time sensor inputs from a simulated environment, saved control inputs for a previous simulation or real world mission, saved sensor inputs from a previous simulation or real world mission, and combinations thereof.

Figure 16:
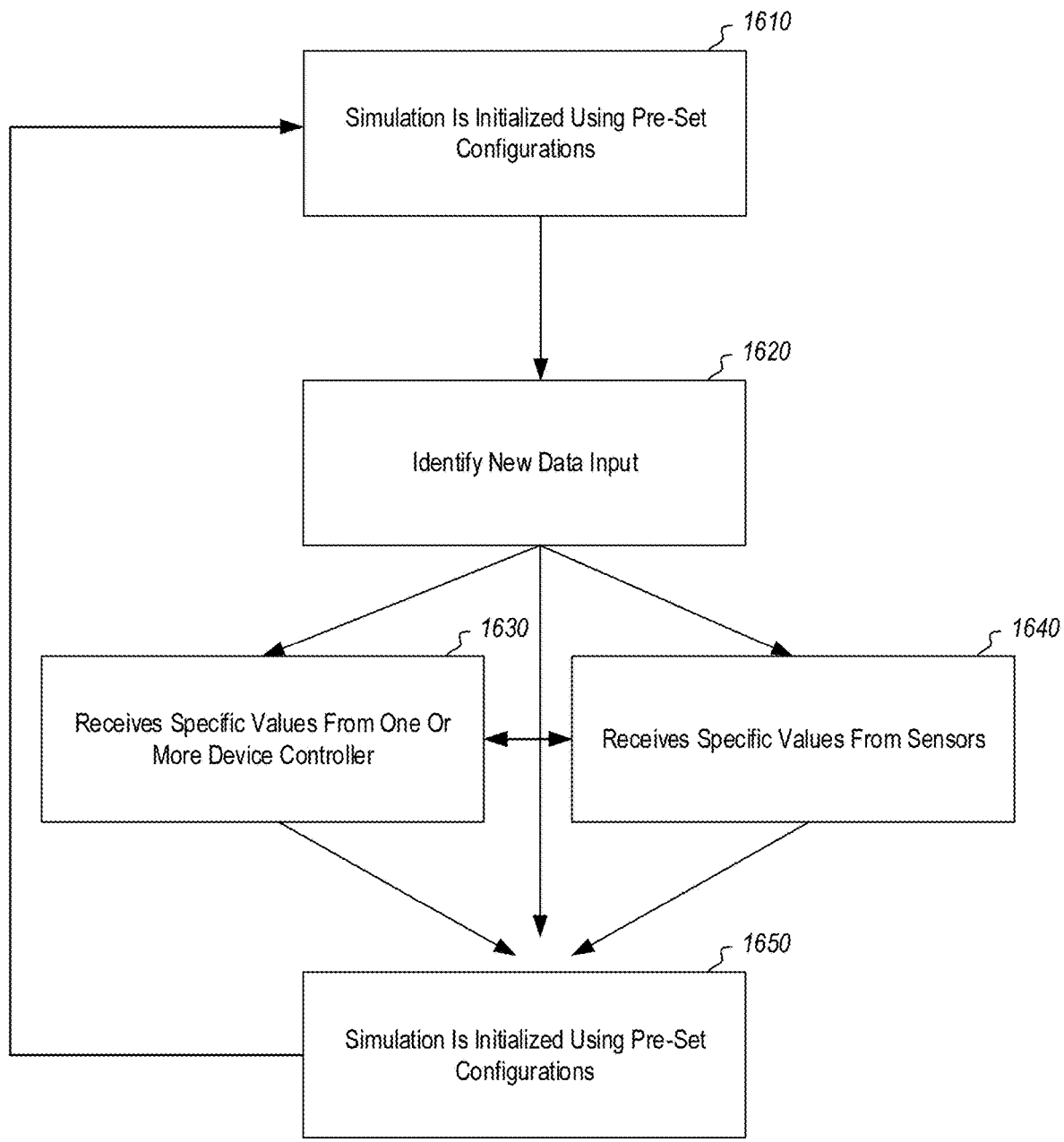
FIG. 16 illustrates a method of performing a simulation.

Referring now to FIG. 16 in which an example method for adjusting the simulation using the various data input methods is depicted. First, a simulation is initialized with pre-set configurations such as the characteristics of the vehicle (act 1610). After the simulation has been initialized, the simulation can identify new data inputs (act 1620). These data inputs, as discussed above can be received from device controllers (act 1630) or from sensors in the simulation and/or collected from the actual world and stored on, in some embodiments, a data pod (act 1640). After receiving information from the device controllers (act 1630), the simulation can receive additional information from sensors (act 1640). Likewise, if the initial new data was received from sensors (act 1640), additional information can be collected from the device controllers (act 1630). After all new data has been collected, the simulation can re-configure to reflect relevant information from the initial configuration and the new data provided (act 1650). If no new data was given from an input source, previously existing pre-set configuration data remains in the configuration. Following the adjustments, the system repeats the identification step 1620, creating a loop.

Figure 17:
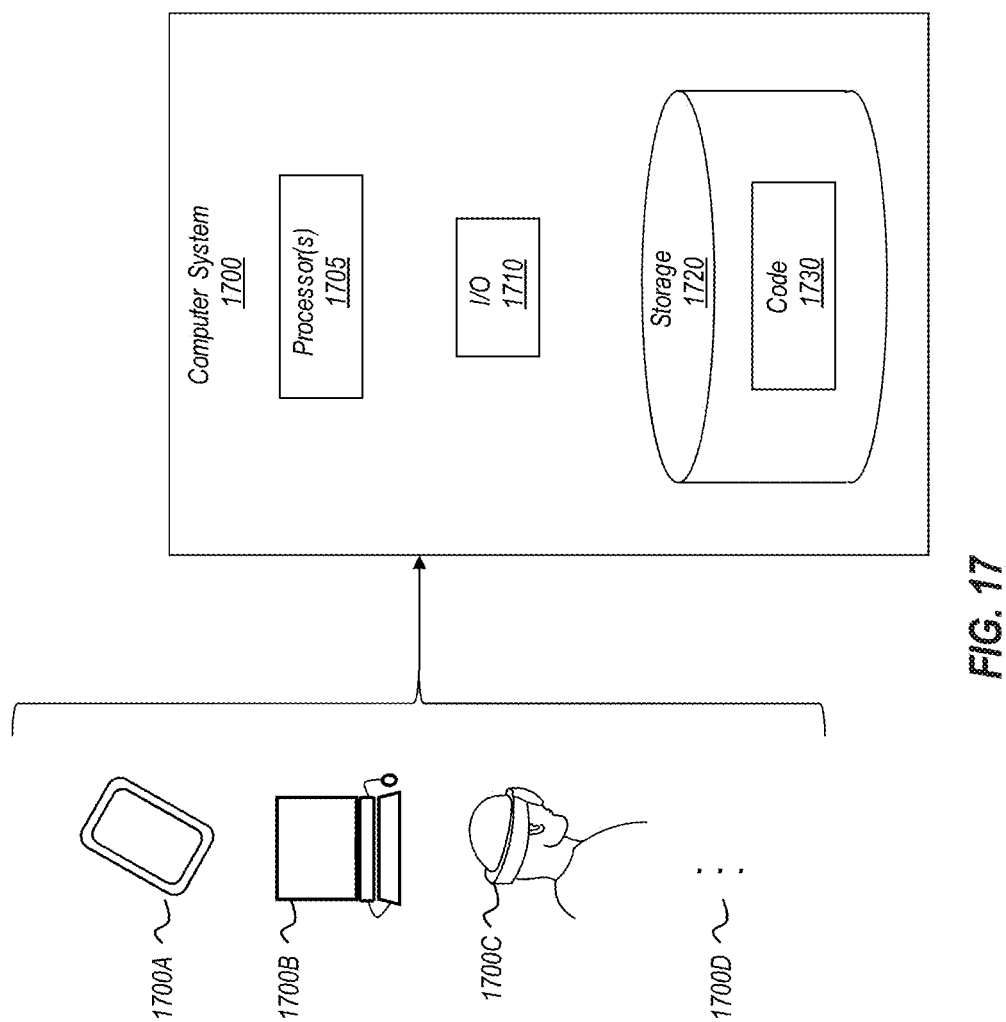
FIG. 17 illustrates an example system where some embodiments may be implemented.

Attention will now be directed to FIG. 17 which illustrates an example computer system 1700 that may be used to facilitate the disclosed methods and/or that may comprise one of the disclosed systems for three-dimensional simulation of an unmanned undersea vehicle. It will be appreciated that computer system 1700 may be configured within various form factors. For example, computer system 1700 may be embodied as a tablet 1700A, a desktop 1700B, or a Head Mounted Display (HMD) 1700C. The ellipsis 1700D demonstrates that computer system 1700 may be embodied in various other forms too. For instance, computer system 1700 may also be a distributed system that includes one or more connected computing components/devices that are in communication with computer system 1700, a laptop computer, a mobile phone, a server, a data center, and/or any other computer system. The ellipsis 1700D also indicates that other system subcomponents may be included or attached with the computer system 1700, including, for example, sensors that are configured to detect sensor data such as environmental conditions that may impact the performance of the lasers.

In its most basic configuration, computer system 1700 includes various different components. For example, FIG. 17 shows that computer system 1700 includes at least one processor 1705 (aka a "hardware processing unit"), input/output ("I/O") 1710, and storage 1720.

Storage 1720 is shown as including executable code/instructions 1730. Storage 1720 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well. As used herein, the term "executable module," "executable component," or even "component" can refer to software objects, routines, or methods that may be executed on computer system 1700. The different components, modules, engines, and services described herein may be implemented as objects or processors that execute on computer system 1700 (e.g. as separate threads).

The disclosed embodiments may comprise or utilize a special-purpose or general-purpose computer including computer hardware, such as, for example, one or more processors (such as processor 1705) and system memory (such as storage 1720), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras, accelerometers, gyroscopes, acoustic sensors, magnetometers, temperature sensors, etc.). Further, computer system 1700 may also be connected through one or more wired or wireless networks to remote systems(s) that are configured to perform any of the processing described with regard to computer system 1700.

During use, a user of computer system 1700 is able to perceive information (e.g., a mixed-reality environment) through a display screen or waveguide that is included with the I/O 1710 of computer system 1700 and that is visible to the user. The I/O interface(s) and sensors with the I/O 1710 also include gesture detection devices, eye trackers, displays, and/or movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

A graphics rendering engine may also be configured, with processor 1705, to render one or more virtual objects within a mixed-reality scene/environment. As a result, virtual objects can accurately move in response to a movement of the user and/or in response to user input as the user interacts within the virtual scene.

A "network," like the network 1735 shown in FIG. 17, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1705). For example, and without limitation, illustrative types of hardware logic components that can be used include Field-Programmable Gate Arrays (FPGAs), Program-Specific or Application-Specific Integrated Circuits (ASICs), Program- Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle test system comprising:
    a vehicle simulator comprising hardware from a vehicle to be tested;
    a controller coupled to the vehicle simulator configured to provide control inputs to devices for the vehicle simulator; and
    a 3D environmental simulator coupled to the vehicle simulator, wherein the 3D environmental simulator is configured to simulate and display a virtual 3D environment painted with real world data and to simulate and display movement of a virtual vehicle simulated by the vehicle simulator in the virtual 3D environment, including at least one of speed of a vehicle with reference to a sea bottom or height from a sea bottom, based on control inputs to devices for the vehicle simulator from the controller to the vehicle simulator, wherein the controller is configured to provide control data comprising a sequence of user input commands previously gathered from a vehicle in a real-world environment, in time stamped data to perform a sequential simulation in an ordered fashion according to the time stamped data, to the vehicle simulator.

2. The vehicle test system of claim 1, wherein the vehicle simulator is configured to receive additional input by one or more actual or simulated sensors.

3. The vehicle test system of claim 2, further comprising one or more simulated sensors such that the 3D environmental simulator is configured to send data from the 3D environmental simulator, as sensor data, to the vehicle simulator based on simulated sensor detection of a virtual environment simulated by the 3D environmental simulator.

4. The vehicle test system of claim 2, wherein the 3D environmental simulator is configured to provide sensor data previously gathered by physical sensors in a real environment.

5. The vehicle test system of claim 4, further comprising a removable storage device from an actual vehicle attached to the vehicle simulator to transfer collected data to the controller for integration into the simulation.

6. The vehicle test system of claim 1, wherein the 3D environmental simulator comprises a display, which comprises a head mounted device.

7. The vehicle test system of claim 1, wherein the 3D environmental simulator is configured to simulate a virtual 3D environment using data collected from a vehicle in a real environment.

8. The vehicle test system of claim 1, wherein the test system is configured to sequentially replay a mission of a real vehicle in a real environment in the 3D environmental simulator by providing previously collected, time stamped sensor and control inputs from the real vehicle to the vehicle simulator.

9. The vehicle test system of claim 1, wherein the controller comprises a handheld portable for a vehicle.

10. The vehicle test system of claim 1, wherein the controller comprises a general purpose computer system, with appropriate hardware and software to form a special purpose computer system for controlling a vehicle.

11. A method for creating three-dimensional simulations of unmanned undersea vehicles comprising:
    at a vehicle simulator comprising hardware from a vehicle to be tested, receiving control inputs, from a controller coupled to the vehicle simulator, to provide control inputs to devices for the vehicle simulator, wherein the controller provides control data comprising a sequence of user input commands previously gathered from a vehicle in a real-world environment, in time stamped data to perform a sequential simulation in an ordered fashion according to the time stamped data to the vehicle simulator; and
    at a 3D environmental simulator coupled to the vehicle simulator, simulating and displaying a virtual 3D environment painted with real world data and simulating and displaying movement of a virtual vehicle simulated by the vehicle simulator in the virtual 3D environment, including at least one of speed of a vehicle with reference to a sea bottom or height from a sea bottom, based on using the control data for the vehicle simulator and outputs from the vehicle simulator.

12. The method of claim 11, further comprising the vehicle simulator receiving additional input by one or more actual or simulated sensors.

13. The method of claim 12, wherein receiving additional input comprises receiving additional input from one or more simulated sensors simulated by the 3D environmental simulator sending data from the 3D environmental simulator, as sensor data, to the vehicle simulator based on simulated sensor detection of a virtual environment simulated by the 3D environmental simulator.

14. The method of claim 12, wherein receiving additional input comprises receiving additional input from the 3D environmental simulator providing sensor data previously gathered by physical sensors in a real environment.

15. The method of claim 11, further comprising the 3D environmental simulator displaying a 3D simulation to a head mounted device.

16. The method of claim 11, wherein simulating a virtual 3D environment is performed using data collected from a vehicle in a real environment.

17. The method of claim 11, wherein simulating a virtual 3D environment and movement of a vehicle comprises sequentially replaying a mission of a real vehicle in a real environment in the 3D environmental simulator by providing previously collected, time stamped sensor and control inputs from the real vehicle to the vehicle simulator.

18. A method of manufacturing a vehicle test system, the method comprising:
    coupling a vehicle simulator, including hardware from a vehicle to be tested to a controller where the controller is configured to provide control inputs to devices for the vehicle simulator; and
    coupling a 3D environmental simulator to the vehicle simulator, wherein the 3D environmental simulator is configured to simulate and display a virtual 3D environment painted with real world data and to simulate and display movement of a virtual vehicle simulated by the vehicle simulator in the virtual 3D environment, including at least one of speed of a vehicle with reference to a sea bottom or height from a sea bottom, based on control inputs to devices for the vehicle simulator from the controller to the vehicle simulator, wherein the controller is configured to provide control data comprising a sequence of user input commands previously gathered from a vehicle in a real-world environment, in time stamped data to perform a sequential simulation in an ordered fashion according to the time stamped data, to the vehicle simulator.

19. The method of claim 18, wherein the 3D environmental simulator is configured to simulate a virtual 3D environment using data collected from a vehicle in a real environment.

20. The method of claim 18, wherein the vehicle test system is configured to replay a mission of a real vehicle in a real environment in the 3D environmental simulator by sequentially providing previously collected, time stamped sensor and control inputs from the real vehicle to the vehicle simulator.

* * * * *